(No Model.)

J. R. FEELEY.
PROCESS OF MANUFACTURING GEM SETTINGS.

No. 253,524. Patented Feb. 14, 1882.

WITNESSES.
Albert D Bean
Warren R. Perce

INVENTOR.
James R Feeley

UNITED STATES PATENT OFFICE.

JAMES R. FEELEY, OF PROVIDENCE, RHODE ISLAND.

PROCESS OF MANUFACTURING GEM-SETTINGS.

SPECIFICATION forming part of Letters Patent No. 253,524, dated February 14, 1882.

Application filed September 29, 1881. (No model.)

*To all whom it may concern:*

Be it known that I, JAMES R. FEELEY, of the city and county of Providence, in the State of Rhode Island, have invented a certain new and Improved Process of Manufacturing Gem-Settings; and I declare the following to be a specification thereof, reference being had to the accompanying drawings.

Like letters indicate like parts.

Figure 1:
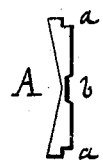
Figure 2:
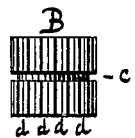
Figure 3:
Figure 5:
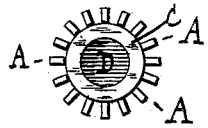
Figure 4:
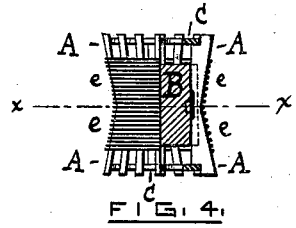
Figure 6:
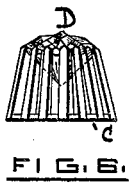

Figure 1 shows the form of the blank prongs or points. Fig. 2 is a side elevation of the grooved hub for assembling the blank points. Fig. 3 is the ring of sheet metal, which is soldered to the prongs to hold them together. Fig. 4 shows, one half in vertical section and one half in side elevation, the grooved block with the prongs assembled thereon and bound with the wire. Fig. 5 is a rear view of the completed setting. Fig. 6 is a side elevation of the setting with its gem in position.

My invention relates to the manufacture of settings to hold gems and precious stones in articles of jewelry and adornment, and is an improved method of assembling and fastening the parts in position by means of a grooved hub, as hereinafter specified.

I first cut out of sheet metal a series of blanks, A, one side of which is straight, having shoulders $a\ a$, and a central recess, $b$, and the other side of which regularly tapers from each end toward the central point, as shown in Fig. 1. I use a cylindrical block or hub, B, which has a circumferential groove on its central line, as shown at $c$ in Fig. 2, and a series of equidistant longitudinal grooves, $d\ d$, upon its periphery. The blanks A are assembled upon the hub B, the straight edge of each blank being fitted into a groove, $d$, therein. When all the grooves $d\ d$ have been thus filled and the blanks placed in position, as shown in Fig. 4, I bind the whole together temporarily by winding a wire, $e$, thereon, as shown in the drawings, thus keeping all the parts securely in place during the succeeding operations. I then fit in a flat sheet-metal ring, C, upon the shoulders $a\ a$ of the blanks A so assembled upon the hub B, and solder said ring upon the blanks at each end, respectively. I then saw through the blanks A upon the central line, $x\ x$, and, removing the wire $e$, withdraw the two sections from the hub B. Each section so withdrawn is a complete gem-setting, as shown in Fig. 6, ready to receive the gem D, which is held therein by bending down the ends of the prongs upon it in the usual manner.

I claim as a novel and useful invention and desire to secure by Letters Patent—

The improved method of constructing gem-settings herein described, consisting in cutting a series of blank prongs, A, shouldered and recessed, as shown, and then in assembling and temporarily binding said blanks A upon a grooved hub, B, and then soldering the ring C within the series of blanks A, and finally cutting said blanks to form gem-settings, substantially as specified.

JAMES R. FEELEY.

Witnesses:
ALBERT D. BEAN,
WARREN R. PERCE.